(12) United States Patent
Trump

(10) Patent No.: US 6,256,384 B1
(45) Date of Patent: Jul. 3, 2001

(54) METHOD AND APPARATUS FOR CANCELLING ECHO ORIGINATING FROM A MOBILE TERMINAL

(75) Inventor: Tõnu Trump, Bandhagen (SE)

(73) Assignee: Telefonaktiebolaget LM Ericsson (publ) (SE)

(*) Notice: Subject to any disclaimer, the term of this patent is extended or adjusted under 35 U.S.C. 154(b) by 0 days.

(21) Appl. No.: 08/982,989

(22) Filed: Dec. 2, 1997

(51) Int. Cl.[7] .................................................. H04B 3/21
(52) U.S. Cl. ........................... 379/411; 379/406; 455/570
(58) Field of Search .................................. 379/406, 407, 379/408, 410, 411, 345, 409; 455/422, 575, 570; 208/322

(56) References Cited

U.S. PATENT DOCUMENTS

| 5,274,705 | | 12/1993 | Younce et al. | 379/410 |
|---|---|---|---|---|
| 5,325,425 | * | 6/1994 | Novas et al. | 379/386 |
| 5,465,413 | * | 11/1995 | Enge et al. | 455/307 |
| 5,533,120 | * | 7/1996 | Staudacher | 379/392 |
| 5,559,881 | | 9/1996 | Sih | 379/410 |
| 5,566,167 | * | 10/1996 | Duttweiler | 370/32.1 |
| 5,610,909 | * | 3/1997 | Shaw | 370/291 |
| 5,646,991 | * | 7/1997 | Sih | 379/410 |
| 5,663,955 | | 9/1997 | Iyengar | 370/291 |
| 5,664,011 | * | 9/1997 | Crochiere et al. | 379/410 |
| 5,668,865 | | 9/1997 | Duttweiler et al. | 379/410 |
| 5,715,319 | * | 2/1998 | Chu | 381/26 |
| 5,796,819 | * | 8/1998 | Romesburg | 379/406 |

FOREIGN PATENT DOCUMENTS 0760 575 A2   3/1997 (EP) .
WO 97/23055   6/1997 (WO) .

OTHER PUBLICATIONS

Standard Search Report for RS 100337 US Completed on 08/14/98, 08/19/98 EPO.

* cited by examiner

Primary Examiner—Wing F. Chan
(74) Attorney, Agent, or Firm—Jenkens & Gilchrist, A Professional Corporation

(57) ABSTRACT

A novel method and apparatus are disclosed for cancelling echoes originating from a digital mobile handset using an echo canceller located in the network. The method and apparatus thus solve a practical echo problem that many mobile telephone operators have long been faced with. The method includes an algorithm that differs significantly from a conventional network echo canceller algorithm, because of the following basic considerations that influenced a solution to the echo problem: (1) the algorithm should not worsen speech quality for digital mobiles that do not generate echoes; and (2) the echo path is non-linear due to two speech coder/decoder pairs in the echo path and a low echo level.

14 Claims, 1 Drawing Sheet

METHOD AND APPARATUS FOR CANCELLING ECHO ORIGINATING FROM A MOBILE TERMINAL

BACKGROUND OF THE INVENTION

1. Technical Field of the Invention

The present invention relates in general to the telecommunications field and, in particular, to network echo cancellation of echoes originating from a mobile terminal, and especially a digital mobile phone.

2. Description of Related Art

"Echo" is a phenomenon that can occur in a telephony system whenever a portion of transmitted speech signal energy is reflected back to the source of the signal. As such, echo has been a problem in telephone networks for a very long time. There can be many different sources of echo, such as, for example, a hybrid circuit that converts a 4-wire line to a 2-wire line in a Public Switched Telephone Network (PSTN) subscriber interface, or acoustical cross-talk in a mobile radiotelephone. A considerable amount of echo can be generated if a telephone set is used in the hands-free mode (e.g., in teleconferencing systems or automobiles).

Echo may not be a problem if the round-trip delay associated with the echo is relatively small. However, the presence of echo along with a substantial delay (e.g., on the order of hundreds of milliseconds) can severely degrade the quality of speech signals, and thus become quite annoying for a listener. The delay in a telephone system can be a physical delay (e.g., caused by the long transmission path over a satellite link) or processing delay. Processing delay is common in digital mobile applications.

An echo canceller is a device that is commonly used in telephony systems to suppress or remove echoes in long distance traffic. For example, in cellular Public Land Mobile Networks (PLMNs), echo cancellers are used in mobile services switching centers (MSCs) to suppress or remove echoes in speech traffic. However, these echo cancellers are designed to cancel echoes originating only in the PSTN side of the connection.

In principle, a digital mobile radiotelephone handset should not generate echoes, because the connection used comprises 4-wires down to the handset. In practice, however, many such mobile phones generate echoes that originate from acoustical or mechanical cross-talk in the handset. This type of echo is annoying to users, especially if the system operator has elected to raise the downlink signal levels. Raising the downlink signal levels has become an accepted practice, since many customers have complained about the low output levels from the mobile handsets' speakers.

There are a number of apparent differences between the characteristics of the echo signals that originate in PSTNs and those that originate in digital mobile phones. For example, the echo path from a PSTN is quasi-linear and, therefore, can be readily modeled by a linear filter. A number of existing solutions, which are based on adaptive filtering techniques, can be used successfully to cancel these types of echoes. As such, the echo return loss (ERL) from a PSTN depends on the balance circuitry used in the network. As a general rule, the ERL (measured in dB) can be considered as a random variable selected from a Gaussian distribution, with a mean of 13.6 dB and a standard deviation of 2.8 dB for a segregated loop balancing scheme.

On the other hand, the echo path for a digital mobile phone is non-linear and time-varying, due to the use of two speech coder/decoder (codec) pairs and radio channels in the transmission path. Additionally, the level of the echo in a digital mobile phone is much lower from that of a PSTN. For example, the specification for the digital cellular Global System for Mobile Communications (GSM) requires an ERL of 46 dB (for the mobile phones) measured for pure tones of level 0 dBm in the 300–3400 Hz band. However, the ERL can be lower if signals other than pure tones are used for the measurements but suppression levels of about 40 dB can still be expected. In fact, the ERL from a digital mobile phone is comparable to the ERL that can be obtained by the linear filter portion of a conventional PSTN echo canceller. However, an effect of the extensive signal processing in the mobile echo path is that the delay between the signal and the echo is longer than in the PSTN echo case.

A natural approach to controlling echoes originating from a mobile handset is to include an echo canceller in the handset. Another approach would be to use a conventional network echo canceller with the echo cancellation directed toward the mobile subscriber. However, a problem with these approaches is that it is impractical and expensive to refurbish existing mobile terminals. Also, an imposition of tighter echo control requirements for digital mobile terminals would influence future products only. As such, tighter echo control requirements for such terminals would not improve the speech quality for the terminals already in use. Furthermore, a conventional network echo canceller will fail if used to cancel echoes originating from a digital mobile terminal, because the resulting echo path is significantly different from the echo path that a network echo canceller is designed to handle. Consequently, new solutions are needed to resolve the problems associated with echoes originating from digital mobile terminals. As described below, the present invention successfully resolves these problems.

SUMMARY OF THE INVENTION

In accordance with the present invention, a novel echo canceller and method of echo cancellation are provided whereby echoes originating from a digital mobile phone are controlled by the echo canceller located in the network side. The present invention thus solves a practical echo problem that many mobile telephone operators have long been faced with. The method includes an algorithm that differs significantly from a conventional network echo canceller algorithm, because of the following basic considerations that influenced a solution to the echo problem: (1) the algorithm should not worsen speech quality for digital mobiles that do not generate echoes; and (2) the echo path is non-linear due to two speech coder/decoder pairs in the echo path and a low echo level.

BRIEF DESCRIPTION OF THE DRAWINGS

A more complete understanding of the method and apparatus of the present invention may be had by reference to the following detailed description when taken in conjunction with the accompanying drawing wherein.

DETAILED DESCRIPTION OF THE DRAWINGS

Figure 1:
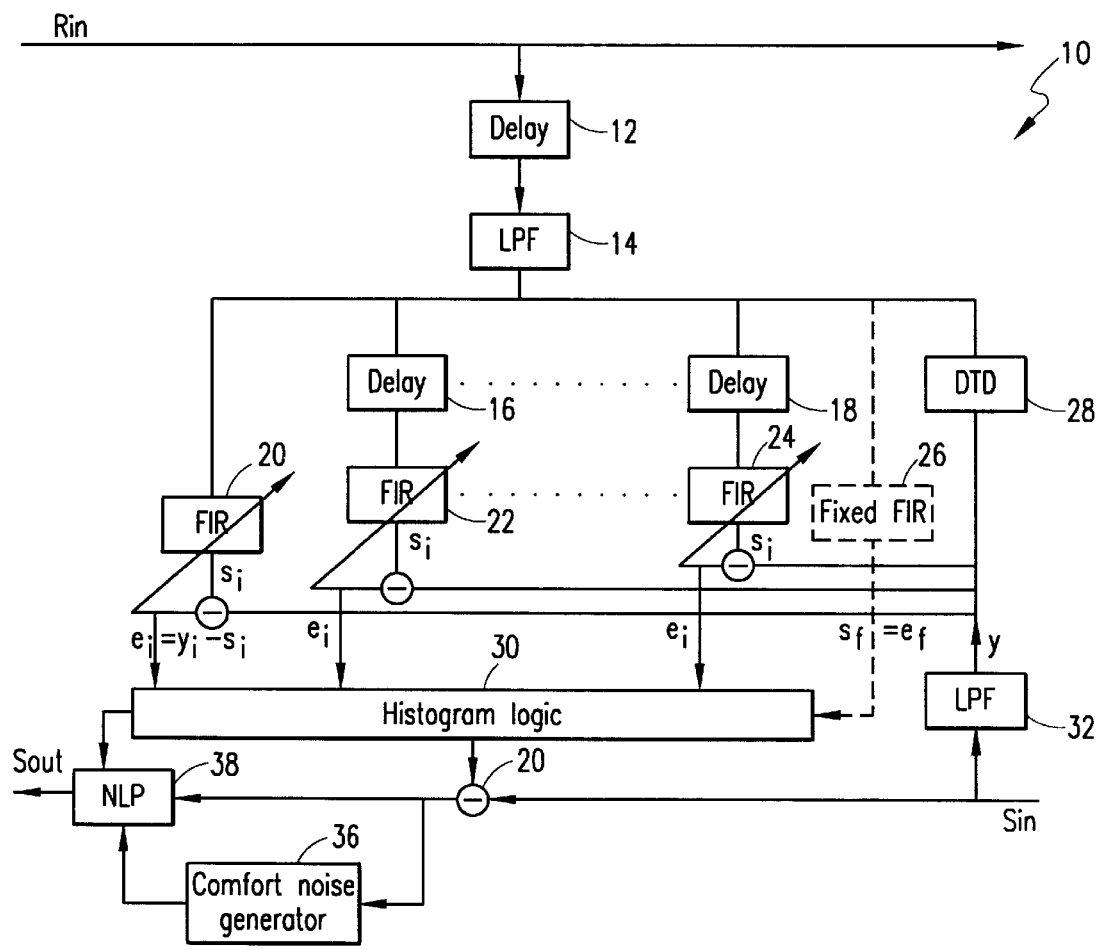
FIG. 1 is a simplified schematic block diagram of an exemplary network echo canceller that can be used to implement a method for cancelling echoes originating from a mobile terminal, in accordance with a preferred embodiment of the present invention.

The preferred embodiment of the present invention and its advantages are best understood by referring to FIG. 1.

Essentially, a novel method and apparatus are provided to cancel echoes originating from a digital mobile handset using an echo canceller located in the network. The method and apparatus thus solve a practical echo problem that many mobile telephone operators have long been faced with. The method includes an algorithm that differs significantly from a conventional network echo canceller algorithm, because of the following basic considerations that influenced a solution to the echo problem: (1) the algorithm should not worsen speech quality for digital mobiles that do not generate echoes; and (2) the echo path is non-linear due to two speech coder/decoder pairs in the echo path and a low echo level.

Specifically, FIG. 1 is a simplified schematic block diagram of an echo canceller 10 that can be used to implement a method (e.g., algorithm) for cancelling echoes originating from a mobile terminal, in accordance with a preferred embodiment of the present invention. For this exemplary embodiment, the echo canceller 10 is a network echo canceller preferably operating in an MSC, and controlling echoes originating from a digital mobile terminal. As such, the signal input to the echo canceller 10 from the network side (Rin) is passed through a 1300 sample (162.5 ms long) delay line 12, which corresponds to the transmission delay for this embodiment. As measurement data show, there is some linear dependence between the input signal (Rin) and the echo only at the lower frequencies. At the same time, a considerable amount of echo power is located at the higher frequencies. Consequently, both the signals (input signal and echo, if it exists) are passed through a lowpass filter 14, before applying linear adaptive filtering in order to reduce the influence of non-linear signal components and noise. Additionally, this lowpass filtering approach makes it possible to sub-sample the input signals before applying them to the adaptive filtering, which reduces the computational complexity of the method. For this embodiment, a lowpass filter 14 is used with a cut off frequency of 2000 Hz.

Measurement data also show that the dispersive part of the echo path impulse response is relatively short (on the order of 1 ms). However, the delay before this short dispersive part of the echo path impulse response occurs can vary from 1300 to 1800 samples. In order to be able to estimate the linear part of the echo path response, along with a rough explicit estimate of the time delay, the lowpass filtered signals (14) are applied to a plurality of adaptive finite-impulse-response (FIR) filters 20, 22, . . . 24, with each such FIR filter adapted independently from the others. Under the control of an adaption algorithm (e.g., executing in software), the FIR filters (20, 22, . . . 24) model the impulse response of the echo path. The input signals to the FIR filters 22, . . . 24 are passed through respective delay lines 16, . . . 18, and delayed with respect to each other so that (for this embodiment) a time span of 512 samples is covered by the whole set of FIR filters. Notably, although three adaptive FIR filters (20, 22, 24) and associated delay lines (16, 18) are shown, more than three such FIR filters can be used (along with an appropriate number of associated delay lines). As such, the output signal from the i-th adaptive filter (20, 22, . . . 26) is denoted by $s_i$, and the error or residual signal associated with the i-th adaptive filter is denoted by $e_i$ (i.e., $e_i = y_i - s_i$). A double talk detector (DTD) 28 is used to control the adaptation of the FIR sub-filters (20, 22, . . . 24) as well as the histogram-based logic En(executed in histogram logic unit 30) described below.

The independent adaptation of each of the FIR sub-filters 20, 22, . . . 24 results in a faster adaptation rate than can be provided by a single, full-length FIR filter. This would be advantageous if the mobile handsets were to have their own built-in echo cancellers. However, as measurement data show, these echo cancellers may fail if the signal levels are high. Such a failure results in a relatively strong echo signal for a period of time. However, using a fast converging filter gives a better chance of estimating the echo path with these handsets.

A problem with implementing a faster adaptation rate for the short filters is that there can be a higher sensitivity to double talk conditions than what a full size filter would have. However, one approach to solving this problem if it occurs is to duplicate the best of the adaptive sub-filters with a short fixed filter, which is an approach used in accordance with the present invention, as illustrated by the fixed FIR filter 26 shown in FIG. 1. However, use of such a fixed FIR filter 26 is optional, because the echo attenuation by linear filtering is relatively small for this type of application.

For example, to form a short fixed filter 26, the coefficients of the best adaptive sub-filter are copied into the fixed filter if, during a time interval of 100 sample times, the echo attenuation provided by the best linear filter is higher than 3 dB, and the attenuation is larger than proved by the current fixed filter (i.e., $Pe_i < 0.5 P_y$, and $Pe_i < Pe_f$).

Returning to the method, at each sampling instant of time, the power levels of the residual signals are compared to each other and to the power of the lowpass filtered "near end" signal, "y". Based on the best comparison results as described directly below, the best filter (of the FIR sub-filters) is selected, and if some echo suppression is achieved by the best filter, a corresponding entry in the histogram (preferably executed in a software application in the histogram logic unit 30) is increased. For this embodiment, the histogram logic unit 30 includes a plurality of counters, with each such counter corresponding to an respective adaptive sub-filter (20, 22 . . . 26). The counter corresponding to the i-th adaptive filter is updated by adding "8" to that corresponding counter if the i-th adaptive filter is determined to provide the best echo cancellation (i.e., if $Re_i < 0.9 * R_y$, and $Re_i < Re_j$, I not equal to j, for all j). In other words, only the counter corresponding to the adaptive sub-filter providing the most echo cancellation is updated. In most cases, the decrease in signal power is achieved due to echo cancellation. Consequently, one of the sub-filters 20, 22, . . . 24 is selected as the best filter more often than the other sub-filters. If there is no echo to suppress, an adaptive filter can still decrease the signal power due to the short time correlations between the two speech signals. However, the updates of the histogram (4) due to such short time correlations occur in a random fashion, and no stable maximum appears. Consequently, if the histogram arranged in such a way shows a large and stable maximum (i.e., if one of the filters has provided the best echo reduction over a period of time), it is assumed that the mobile handset involved is generating echo. In that way, the inventive method can distinguish between a well-designed (with respect to ERL) mobile handset and a poorly designed one.

The histogram entries in logic unit 30 are "downdated" for each sample from the sub-filters if there is no obvious double talk, but with a smaller step than that used for updating. "Downdating" an entry means that the method is allowed to "forget" the old echo estimate entered in the histogram for a reasonably short time after a change in the echo path delay (e.g., when a handover occurs). As such, for this embodiment, the downdating is accomplished by subtracting 1 from all of the histogram's counters every sample time if there is no double talk detected. The echo estimate from the FIR sub-filter pointed to by the histogram maximum is subtracted (34) from the "near end" signal, Sin, but only for those samples where a power reduction is achieved by the linear filter. The histogram maximum is determined by checking which counter has the largest value (denoted by $hist_{max}$). Otherwise, the "near end" signal, Sin, is passed without being changed (no subtraction by subtractor 34).

If it is assumed that the mobile handset is generating echo, a non-linear processor (NLP) 38 is activated and applied to the output signal, Sout, being coupled from the linear part of the echo canceller. For this embodiment, the NLP 38 first estimates the echo power as:

$$\hat{P}_s(t) = \frac{127}{128}\hat{P}_s(t) - \frac{1}{128}\|\hat{h}_{max}(t)\|^2 \|x_{max}(t)\|^2, \quad (1)$$

where $\hat{h}_{max}(t)$ is the vector of the sub-filter coefficients selected by the histogram (3), and $x_{max}(t)$ is the vector of the input signal samples in that same sub-filter. However, more generally, the echo power can be estimated by lowpass filtering of:

$$\|\hat{h}_{max}(t)\|^2 \|x_{max}(t)\|^2. \quad (2)$$

Consequently, for example, the power of the error signal, ei, can be computed by lowpass filtering the corresponding signal squared, such as:

$$Pe_i(t) = \frac{127}{128}Pe_i(t-1) + \frac{1}{128}e_i(t)^2. \quad (3)$$

The NLP 38 is activated if, at the same time, the histogram logic (30) determines:

$$hist_{max} > 4096; \quad (4)$$

$$hist_{max} > \frac{3}{16}\sum_i hist_i; \quad (5)$$

$$P_y(t) < -21\text{dBm0}; \quad (6)$$

$$\hat{P}_s(t) > 2P_y(t), \quad (7)$$

where $P_y(t)$ denotes the lowpass filtered "near end" signal (Sin) power at time t, and $hist_i$ is the i-th entry to the histogram (30). The first two inequalities above (4 and 5) make sure that the histogram maximum is stable and distinct (i.e., that the digital mobile handset is one that generates echo). The latter two inequalities (6 and 7) compare the estimated echo power to the "near end" signal power, $P_y$.

Apparently, some wideband input signals from such sounds as "s" and "z" generate a high frequency echo that has almost no linear relationship with the input signal. Additionally, attenuation of this high frequency echo is often much less than that of echoes on average, so that a relatively low power input signal for this high frequency echo can generate an audible echo signal.

In order to cope with this type of (high frequency) echo, the NLP 38 is activated if the inequalities (4) and (5) hold, and in addition:

$$P_y(t) < -38\text{dBm0}; \quad (8)$$

$$\hat{P}_s(t) > 0.2P_y(t); \quad (9)$$

$$4P_y(t) < P_{Ssin}(t). \quad (10)$$

The inequality (8) allows clipping by the NLP 38 for low power signals only. Since these high frequency echoes appear to be relatively weak, the condition in inequality (8) is set at 17 dB lower than the corresponding condition in inequality (5). The inequality (9) checks to determine if the input signal power is such that audible echo can occur. Note that this condition is relaxed by 10 dB compared to the corresponding condition in inequality (7). The last inequality (10) allows clipping by the NLP 38 only if the echo is dominated by high frequency components (e.g., if the power in the lower half-band is less than one fourth of the total power of the "near end" signal). Finally, similar to a conventional network echo canceller, echo canceller 10 can include a comfort noise generator 36 to be used to insert comfort noise into the output signal, Sout, if the output signal is suppressed by the NLP 38.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for use in an echo canceler, comprising a plurality of adaptive filters, for controlling an echo signal originating from a digital mobile terminal, comprising the steps of:

determining if an adaptive filter sample histogram maximum value associated with said echo signal is greater than a first predetermined value;

determining if said adaptive filter sample histogram maximum value associated with said echo signal is greater than a second value;

and inserting a non-linearity in an output signal from a network echo canceller in communication with said digital mobile terminal if the following inequalities hold:

$$\hat{P}_s(t) > 0.2P_y(t);$$

$$P_y(t) < -38\text{dBm0};$$

$$4P_y(t) < P_{Sin}(t). \quad (2)$$

2. An echo canceller found in a mobile services switching center for canceling echo originating from a mobile station, comprising:

a plurality of adaptive filters, each of said adaptive filters for modeling an impulse response of an echo path so that said plurality of adaptive filters span an entire sample;

means for controlling an independent adaptation of each of said plurality of adaptive filters;

a histogram logic unit coupled to an output of each of said plurality of adaptive filters, for determining whether a mobile terminal in communication with said echo canceller is generating echo; and a non-linear processor responsive to said histogram logic unit, for introducing non-linearity to an output signal from said echo canceller if said mobile terminal is generating echo.

3. The echo canceller of claim 1, further comprising a short fixed filter coupled to said histogram logic unit for reducing sensitivity to double talk conditions.

4. The echo canceller of claim 1, wherein said echo canceller resides in a network side of a mobile telephone network.

5. The echo canceller of claim 1, wherein said echo canceller resides in a network side of a fixed telephone network.

6. The echo canceller of claim 1, wherein said means for controlling includes a double talk detector.

7. The echo canceller of claim 1, further comprising a delay line for delaying input signals to said plurality of adaptive filters so that a time span of 512 samples is covered by said plurality of adaptive filters, and a lowpass filter coupled between a network signal input and said plurality of adaptive filters.

8. The echo canceller of claim 1, wherein said plurality of adaptive filters comprises a full-length FIR filter.

9. The echo canceller of claim 1, wherein said mobile terminal comprises a digital mobile phone.

10. A method for use in an echo canceler, comprising a plurality of adaptive filters, for controlling a high frequency echo signal originating from a mobile terminal, comprising the steps of
estimating, in a network echo canceller in communication with said mobile terminal, a power level of said echo signal; and
inserting a non-linearity in an output signal from said network echo canceller if an adaptive filter sample histogram maximum value associated with said echo signal is greater than a predetermined value.

11. The method of claim 10, wherein said mobile terminal comprises a digital mobile phone.

12. The method of claim 10, wherein said estimating step comprises lowpass filtering of:

$$\|\hat{h}_{max}(t)\|^2 \|x_{max}(t)\|^2, \tag{11}$$

wherein $\hat{h}_{max}(t)$ is a vector of sub-filter coefficients selected by a histogram, and $x_{max}(t)$ is a vector of input signal samples in said sub-filter.

13. The method of claim 12, wherein said estimating step comprises estimating said power level as:

$$\hat{Ps}(t) = \frac{127}{128}\hat{Ps}(t) - \frac{1}{128}\|\hat{h}_{max}(t)\|^2 \|x_{max}(t)\|^2, \tag{12}$$

wherein $\hat{h}_{max}(t)$ is said vector of sub-filter coefficients selected by said histogram, and $x_{max}(t)$ is said vector of input signal samples in said sub-filter.

14. The method of claim 10, wherein said predetermined value is 4096.

* * * * *

UNITED STATES PATENT AND TRADEMARK OFFICE
CERTIFICATE OF CORRECTION

| | |
|---|---|
| PATENT NO. | : 6,256,384 B1 |
| DATED | : July 3, 2001 |
| INVENTOR(S) | : Tonu Trump |

It is certified that error appears in the above-identified patent and that said Letters Patent is hereby corrected as shown below:

<u>Column 3,</u>
Line 60, replace "En (executed" with -- (executed) --

Signed and Sealed this

Twelfth Day of March, 2002

Attest:

JAMES E. ROGAN
*Attesting Officer*  *Director of the United States Patent and Trademark Office*